United States Patent
Bai et al.

(10) Patent No.: US 8,385,936 B2
(45) Date of Patent: Feb. 26, 2013

(54) METHOD AND DEVICE OF INTERFERENCE SUPPRESSION IN WIRELESS CELLULAR NETWORK

(75) Inventors: Yong Bai, Beijing (CN); Juejia Zhou, Beijing (CN); Minghai Feng, Beijing (CN); Lan Chen, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 246 days.

(21) Appl. No.: 12/795,573

(22) Filed: Jun. 7, 2010

(65) Prior Publication Data

US 2010/0317363 A1    Dec. 16, 2010

(30) Foreign Application Priority Data

Jun. 15, 2009  (CN) .......................... 2009 1 0145838
May 19, 2010  (CN) .......................... 2010 1 0179310

(51) Int. Cl.
*H04W 72/00*    (2009.01)

(52) U.S. Cl. .................. 455/452.2; 455/452.1; 455/450; 455/451; 455/453

(58) Field of Classification Search ............... 455/114.2, 455/423, 434, 450, 451, 452.1, 452.2; 370/310, 370/314, 329, 332, 338, 335, 336, 337
See application file for complete search history.

(56) References Cited

U.S. PATENT DOCUMENTS

2009/0109935 A1 *  4/2009  Pan et al. ...................... 370/335
2009/0197588 A1    8/2009  Khandekar et al.

FOREIGN PATENT DOCUMENTS

WO    WO 2009/055619 A1    4/2009
WO    WO 2009/065075 A1    5/2009

OTHER PUBLICATIONS

European Search Report for corresponding European Patent Application No. 10166002.5, Sep. 17, 2010, 8 pgs.

* cited by examiner

*Primary Examiner* — Kathy Wang-Hurst
(74) *Attorney, Agent, or Firm* — Blakely, Sokoloff, Taylor & Zafman LLP

(57) ABSTRACT

A method of interference suppression in a wireless cellular network includes notifying a first base station that there is a second User Equipment (UE) that currently suffers downlink interferences from the first base station, when an second UE in an active state suffers the downlink interferences from the first base station; and reallocating, by the first base station, spectrum resources for a first UE communicating with the first base station. A first base station, a second UE and a second base station for implementing the above method of interference suppression are also provided. When the second UE in the active state suffers the downlink interferences from an adjacent first base station, the first base station can adjust the spectrum resources occupied by the first UE through resource scheduling, so as to reduce the downlink interferences on the second UE in the active state, thus to reduce the influence on the communication between the second UE and the second base station.

14 Claims, 5 Drawing Sheets

METHOD AND DEVICE OF INTERFERENCE SUPPRESSION IN WIRELESS CELLULAR NETWORK

PRIORITY

The present application claims priority to and incorporates by reference the entire contents of Chinese patent application No. 200910145838.9, filed in China on Jun. 15, 2009, and Chinese patent application No. 201010179310.6, filed in China on May 19, 2010.

FIELD OF THE INVENTION

Embodiments of the present invention relate to wireless communication technologies, and particularly to a method and device of interference suppression in a wireless cellular network.

BACKGROUND OF THE INVENTION

The wireless cellular network adopts cellular-form network architecture to provide a communication service such as voice and data and the like for a mobile user. Typically, a cell provides wireless communication transmission coverage of a certain range. Specifically, the cell having the largest wireless communication transmission coverage radius is a Macrocell. A plurality of Macrocells may implement wide-range seamless wireless communication transmission coverage. A base station supporting the Macrocell is called a Macrocell base station, its emission power is larger, and its antenna arrangement height is higher, e.g. an eNodeB (eNB) in a 3GPP LTE or a 3GPP LTE-A network, etc.

In order to increase the capacity of the wireless cellular network and to improve the wireless communication service quality in its coverage area, a cell with a smaller transmission radius than the Macrocell (e.g. Microcell, Picocell, Femtocell and etc.) may be used in a hotspot area and may be used indoors. The base station of the cell having a smaller transmission radius than that of the Macrocell typically has a smaller emission power and a lower antenna arrangement height than those of the Macrocell base station.

Typically, the above cell having various transmission radii may be present in a particular potion of area simultaneously. At this time, the base station of the cell having various transmission radii may provide overlapped wireless network coverage of at least two layers in the area where the coverage thereof overlaps, i.e. the cell having the larger transmission radius (e.g. the Macrocell) provides the wireless network coverage of one layer and the cell having the smaller transmission radius (e.g. the Femtocell) provides the wireless network coverage of another layer.

In embodiments of the present invention, to facilitate description, the cell having the larger transmission radius in the wireless cellular network having the wireless network coverage of at least two layers is called a major cell, while the wireless cell having the smaller transmission radius therein is called a small cell. Specifically, the transmission radius of the major cell is larger than that of the small cell. For example, in the wireless cellular network where the coverage of the Macrocell overlaps that of the Microcell or that of the Picocell or that of the Femtocell, the major cell refers to the Macrocell, and the small cell refers to the Microcell, the Picocell or the Femtocell; in the wireless cellular network where the coverage of the Microcell overlaps that of the Picocell or that of the Femtocell, the major cell refers to the Microcell, and the small cell refers to the Picocell or the Femtocell; while in the wireless cellular network where the coverage of the Picocell overlaps that of the Femtocell, the major cell refers to the Picocell, and the small cell refers to the Femtocell. Correspondingly, the base station in the major cell is called a major base station, e.g. a Macrocell base station; while the base station of the small cell is called a small base station, e.g. a Home eNodeB (HeNB) supporting the Femtocell coverage in the 3GPP LTE or the 3GPP LTE-A network, and may be easily disposed in home or office by the user.

Within the area having the overlapped wireless network coverage of at least two layers, the UE (User Equipment) of the mobile user may select to access the major cell or the small cell. For example, in the 3GPP LTE or the 3GPP LTE-A network, the eNB supports the Macrocell coverage, while the HeNB supports the Femtocell coverage. In the area where the coverage of the eNode B overlaps that of the HeNB, the UE may select to access the eNB or the HeNB. In embodiments of the present invention, to facilitate description, the UE accessing the major base station (e.g., Macrocell) is collectively called Major-cellular User Equipment (MUE), while the UE accessing the small base station is collectively called Home User Equipment (HUE).

In such communication environment having the wireless network coverage of at least two layers as described above, the spectrum occupied by the two-layer wireless network may be shared with each other, and the spectrum range shared by the two-layer wireless network may be all or part of the available spectrum. For example, in the case that the available spectrum bandwidth of the two-layer wireless network is 20 MHz in total, if the spectrum range shared by the two-layer wireless network is all the available spectrum range, the major cellular network and the small cellular network may both use the spectrum resources of such 20 MHz; while if the spectrum range shared by the two-layer wireless network is part of the available spectrum range, the major cellular network may use part of the spectrum resources (e.g. 15 MHz), while the small cellular network may use all the 20 MHz spectrum resource.

When the spectrum range occupied by the major cellular network and the small cellular network is shared, there is co-channel interference between the two-layer wireless network. Thus, in a Frequency Division Duplex (FDD) system, the interference between the two-layer wireless network may be divided into four types of uplink and downlink interference as follows, i.e. including: the downlink interference on the HUE from the major base station, the downlink interference on the MUE from the small base station, the uplink interference on the major base station from the HUE and the uplink interference on the small base station from the MUE. When the MUE in an active state is communicating with the major base station, if the MUE is relatively close to the small base station, the MUE may suffer more serious downlink interference from the small base station, which may result in the communication between the MUE and the major base station to be interrupted. Further, when a HUE in an active state is communicating with a small cellular base station, if the HUE is relatively close to a big base station, the HUE may suffer more serious downlink interference from the big base station, which may result in the communication between the HUE and the small cellular base station to be interrupted.

SUMMARY OF THE INVENTION

In order to solve the above technical problem, embodiments of the present invention include a method and device of interference suppression in a wireless cellular network having wireless network coverage of at least two layers, which can reduce the downlink interference on the surrounding MUE in the active state from the small base station, thereby ensuring the communication quality of the MUE with the major base station.

A method of interference suppression in a wireless cellular network having wireless network coverage of at least two layers according to an embodiment of the present invention includes: notifying a first base station that there is a second User Equipment (UE) that currently suffers downlink interferences from the first base station, when a second UE in an active state suffers downlink interferences from the first base station; and reallocating, by the first base station, spectrum resources for a first UE communicating with the first base station.

A process of notifying the first base station that there is a second UE that currently suffers downlink interferences from the first base station includes: sending, by the second UE, a measurement report to a second base station, wherein the measurement report carries a Physical Cell ID (PCI) of the first base station; determining, by the second base station, whether the received PCI of the first base station is undistinguishable, and if the received PCI of the first base station is undistinguishable at the second base station, sending, by the second base station, a message used for reading an E-UTRAN Cell Global Identifier (ECGI) of the first base station, and reporting, by the second UE, the ECGI of the first base station to the second base station; and if the received PCI of the first base station is distinguishable at the second base station, obtaining, by the second base station, the ECGI of the first base station according to the PCI of the first base station that is reported from the second UE; sending, by the second base station, a second UE ARRIVAL message to a Mobile Management Entity (MME), wherein the second UE ARRIVAL message carries the ECGI of the first base station; and forwarding, by the MME, the received second UE ARRIVAL message to the first base station that forms the downlink interferences on the second UE.

Alternatively, the process of notifying the first base station that there is an second UE that currently suffers downlink interferences from the first base station includes: sending, by the second UE, a signal over one or more subcarriers of a reserved Resource Block; performing, by the first base station, energy detection on the subcarrier of the reserved Resource Block; and when the energy detected on the subcarrier of the reserved Resource Block exceeds a preset threshold, determining, by the first base station, that there is an second UE that suffers downlink interferences from the first base station.

A process of detecting whether the second UE suffers downlink interferences from the first base station includes: detecting, by the second UE, a Reference Signal Received Power (RSRP) of the base station; if the RSRP exceeds a preset threshold, determining whether the PCI of the base station belongs to a Closed Subscriber Group Physical Cell ID Range and whether the base station is included in a white list of the second UE; and if the PCI of the base station whose RSRP exceeds the preset threshold belongs to the Closed Subscriber Group Physical Cell ID Range and the base station is not included in the white list of the second UE, determining, by the second UE, that the second UE suffers downlink interferences from a first base station.

A process of reallocating, by the first base station, spectrum resources occupied by an first UE communicating with the first base station includes: reallocating to the first UE that previously occupies the shared spectrum resources, spectrum resources that is not shared with the second base station, to release the spectrum resources shared with the second base station; and/or releasing, partially or entirely, spectrum resources occupied by non-real-time service of the first UE; and/or on the basis that Quality of Service (QoS) or Quality of Experience (QoE) of the first UE is not decreased, partially releasing spectrum resources occupied by real-time service of the first UE; and/or releasing key spectrum resources occupied by communications between the second base station and the second UE.

In one embodiment, the method further includes: notifying the first base station that the second UE no longer suffers downlink interferences from the first base station when the second UE changes from the active state into an idle state or the second UE detects the downlink interferences from the first base station has been below a preset threshold.

In one embodiment, the method further includes: after being aware that the second UE no longer suffers downlink interferences from the first base station, reallocating, by the first base station, spectrum resources for the first UE communicating with the first base station.

In one embodiment, the process of notifying the first base station that the second UE no longer suffers downlink interferences from the first base station includes: sending, by the second UE, a measurement report to the second base station, wherein a PCI or ECGI of the first base station that forms downlink interferences on the second UE is carried in the measurement report; sending, by the second base station, an second UE DEPARTURE message to an MME, wherein the second UE DEPARTURE message carries the ECGI of the first base station that forms downlink interferences on the second UE; and forwarding, by the MME, the second UE DEPARTURE message to the first base station.

In one embodiment, the process of notifying the first base station that the second UE no longer suffers the downlink interferences from the first base station includes: stopping, by the second UE, sending a signal over one or more subcarriers of a reserved Resource Block.

Alternatively, the process of notifying the first base station that the second UE no longer suffers the downlink interferences from the first base station includes: sending, by the second UE, a signal over a second subcarrier of a reserved Resource Block; and performing, by the first base station, energy detection on the second subcarrier of the reserved Resource Block; and when energy detected on the second subcarrier is above a preset threshold, determining, by the first base station, that there is no surrounding second UE that suffers the downlink interferences from it.

Another embodiment of the present invention includes a method of interference suppression in a wireless cellular network, which includes: when a second UE in an active state suffers downlink interferences from an adjacent first base station, reallocating spectrum resources for the second UE by a second base station.

In one embodiment, the process of reallocating spectrum resources for the second UE includes: releasing, by the second base station, a part of or all of its spectrum resources and reallocating spectrum resources which are not occupied by the first base station to the second UE.

In one embodiment, the method further includes: when the second UE changes from the active state into an idle state or the second UE detects the downlink interference from the first base station that forms the downlink interferences on the second UE has been below a preset threshold, reallocating, by the second base station, spectrum resources for the second UE.

In one embodiment, the spectrum resources comprises one of sub-carriers, resource blocks, component carriers or bands.

An embodiment of the present invention includes a first base station, which includes: a notification receiving unit, adapted to receive a second UE ARRIVAL message from a Mobile Management Entity (MME), wherein the second UE ARRIVAL message indicates that there is a second UE that currently suffers downlink interferences from it; and a resource allocating unit, adapted to reallocate, after the second UE ARRIVAL message is received, spectrum resources for a first UE communicating with it.

An embodiment of the present invention includes a second User Equipment (UE), which includes: an interference detecting unit, adapted to detect whether there is a first base station that forms downlink interferences on it; and an interference reporting unit, adapted to send, when it is detected that there is a first base station that forms the downlink interferences on it, a measurement report to a second base station, wherein a Physical Cell ID (PCI) of the first base station is carried in the measurement report.

In one embodiment, the second UE further includes: an E-UTRAN Cell Global Identifier (ECGI) reporting unit, adapted to determine, after receiving a message used for reading an ECGI of the first base station from the second base station, the ECGI of the first base station that forms the downlink interferences on it, and to report the determined ECGI to the second base station.

An embodiment of the present invention includes a second base station, which includes: a measurement report receiving unit, adapted to receive a measurement report from a second UE, wherein a Physical Cell ID (PCI) of a first base station that forms downlink interferences on the second UE is included in the measurement report; an E-UTRAN Cell Global Identifier (ECGI) reading unit, adapted to determine whether the received PCI of the first base station is undistinguishable, and if yes, to send a message used for reading an ECGI of the first base station to the second UE, and to receive the ECGI of the first base station that is fed back from the second UE, or otherwise, to obtain the ECGI of the first base station according to the PCI of the first base station that is reported from the second UE; and a notifying unit, adapted to send an second UE ARRIVAL message to a Mobile Management Entity MME, wherein at least the ECGI of the first base station that forms the downlink interferences on the second UE is carried therein.

Another embodiment of the present invention includes a first base station, which includes: a signal detecting unit, adapted to perform energy detection on a subcarrier of a reserved Resource Block; and when detected energy is above a preset threshold, to determine that there is a second UE that suffers downlink interferences from it; and a resource allocating unit, adapted to reallocate, after it is determined that there is a second UE that suffers downlink interferences from it, spectrum resources for a first UE communicating with the first base station to reduce the downlink interferences on the second UE from it.

In one embodiment, the resource allocating unit includes: a non-shared resource reallocating component, adapted to allocate, to the first UE that previously occupies shared spectrum resources, spectrum resources that is not shared with a second base station and to release the spectrum resources shared with the second base station; and/or a non-real-time service resource releasing component, adapted to release, partially or entirely, spectrum resources occupied by non-real-time service of the first UE that is communicating with it; and/or a real-time service resource releasing component, adapted to partially release, on the basis that Quality of Service QoS or Quality of Experience QoE of the first UE is not decreased, the spectrum resources occupied by real-time service of the first UE that is communicating with it; and/or a key spectrum resource releasing component, adapted to release key spectrum resources occupied by communications between the second base station and the second UE.

Another embodiment of the present invention includes a second UE, which includes: an interference detecting unit, adapted to detect whether there is a first base station that forms downlink interferences on it; and an interference notifying unit, adapted to send, when it is detected that there is a first base station that forms downlink interferences on it, a signal over one or more subcarriers of a reserved Resource Block.

In one embodiment, the interference detecting unit includes: a Reference Signal Received Power detecting component, adapted to detect whether a Reference Signal Received Power RSRP of the base station that it receives exceeds a preset threshold; and a base station identifier determining component, adapted to determine whether a PCI of the base station the RSRP of which exceeds the preset threshold belongs to a Closed Subscriber Group Physical Cell ID Range and whether the base station is included in a white list of it; and if the PCI of the base station belongs to the Closed Subscriber Group Physical Cell ID Range and the base station is not included in the white list of it, to determine it is detected that there is an adjacent first base station that forms the downlink interferences on it.

Still another embodiment of the present invention includes a second base station, which includes: a measurement report receiving unit, adapted to receive a measurement report from a second user equipment (UE), wherein the measurement report includes the PCI of a first base station which forms downlink interferences on the second UE; a resource allocating unit, adapted to reallocate spectrum resources which are not occupied by the first base station for the second UE.

According to the method and device of interference suppression in a wireless cellular network having wireless network coverage of at least two layers that is proposed by the present invention, when the communication between the second UE in the active state and the second base station suffers the downlink interference from the adjacent first base station, the first base station can be notified, so that the first base station can adjust the spectrum resource occupied by the first UE through resource scheduling, so as to reduce the downlink interference on the second UE from the first base station, or it is the second base station which adjusts the spectrum resource occupied by the second UE through resource scheduling, so as to reduce the downlink interference on the first UE from the second base station.

BRIEF DESCRIPTION OF THE DRAWINGS

Hereinbelow, illustrative embodiments of the present invention will be described in detail with reference to the accompanying drawings, so that those ordinarily skilled in the art can better understand the above and other features and advantages of the present invention. In the accompanying drawings.

DETAILED DESCRIPTION OF THE EMBODIMENTS

To make the objects, technical solutions and advantages of the present invention more apparent, the present invention is described in more detail hereinbelow with reference to the accompanying drawings and the embodiments.

To facilitate the description of embodiments of the present invention, the base station and UE relating to a first wireless network coverage in the wireless cellular network having the wireless network coverage of at least two layers are respectively called a first base station and a first UE, while the base station and UE relating to a second wireless network coverage in the wireless cellular network having the wireless network coverage of at least two layers are respectively called a second base station and a second UE. To be noted, the first base station of the present invention can refer to a major cellular base station, in this case, the second base station refers to a small cellular base station, the first UE refers to an MUE and the second UE refers to an HUE; accordingly, the first base station of the present invention can also refer to a small cellular base station, in this case, the second base station refers to a major cellular base station, the first UE refers to an HUE and the second UE refers to an MUE.

In the existing wireless cellular network having the wireless network coverage of at least two layers, the first base station is unable to be aware of whether there is an adjacent second UE that suffers downlink interferences therefrom, thus even if there is another free spectrum resources for the first base station, the first base station cannot adjust the spectrum resources of the first UE that is communicating therewith to release the spectrum resources occupied by the second UE. Moreover, the second base station is also unable to be aware of whether there is a second UE in its coverage that suffers downlink interferences from an adjacent first base station, thus even if the second base station has free spectrum resources, the second base station cannot adjust the spectrum resources of the second UE to avoid the spectrum resources badly influenced by the first base station. In order to solve the above problem to reduce downlink interferences on the adjacent second UE in the active state from the first base station in the wireless cellular network having the wireless network coverage of at least two layers, thus to ensure the communication quality of the second UE with the second base station, the embodiment of the present invention provides a method of interference suppression in a wireless cellular network having wireless network coverage of at least two layers.

Embodiment 1

Figure 1:
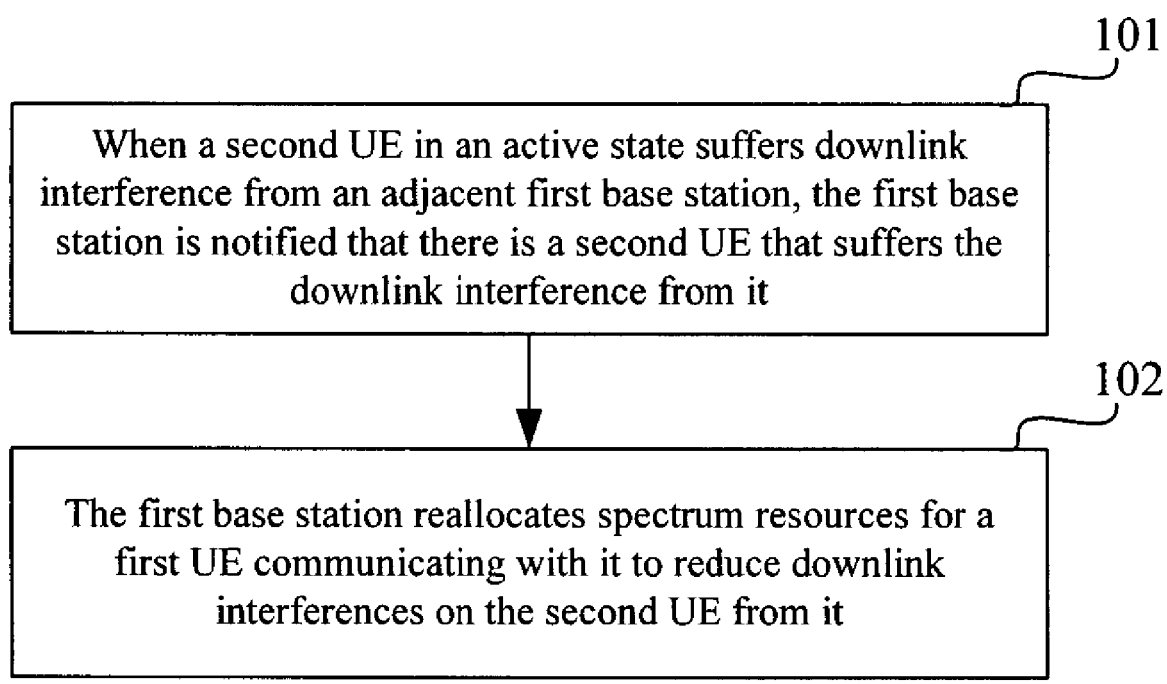
FIG. 1 is a flowchart of a method of interference suppression in a wireless cellular network having wireless network coverage of at least two layers according to an embodiment of the present invention.

The operation procedure of the method of interference suppression in a wireless cellular network having wireless network coverage of at least two layers according to Embodiment 1 is as illustrated in FIG. 1, which mainly includes the following:

Step 101: When a second UE in an active state suffers downlink interferences from an adjacent first base station, the first base station is notified that there is a second UE that suffers the downlink interference therefrom.

Step 102: The first base station reallocates spectrum resources for a first UE communicating therewith to reduce the downlink interferences on the second UE.

To be noted, in embodiments of the present invention, the spectrum resources can refer to sub-carriers, resource blocks (RB), component carriers (CC) or bands.

Further, when the second UE changes from the active state into an idle state or the second UE detects the downlink interferences from the first base station being below a preset threshold, the above method may further include the following:

Step 103: The first base station is notified that the second UE no longer suffers the downlink interferences therefrom.

Step 104: The first base station reallocates the spectrum resources for the first UE communicating therewith.

In the above Step 101, the process of detecting whether there is a second UE that suffers downlink interferences from an adjacent first base station can be performed by the second UE itself, or that process can be performed by another entity in the wireless cellular network, such as a road test entity. That is, embodiments of the present invention do not put a limitation on the entity which performs the process of detecting whether there is a second UE that suffers downlink interferences from a first base station. And when detecting that there is a second UE that suffers downlink interference from a first base station, the first base station is notified such a situation. Moreover, in order to notify the first base station that there is a second UE that suffers the downlink interference from it, the embodiment of the present invention provides two methods for notifying the first base station, which will be explained in detail on the basis that the process of detecting whether there is a second UE that suffers downlink interferences from a first base station is performed by the second UE itself.

Method 1:

In the Method 1, when the second UE detects that the downlink interference from an adjacent first base station reaches a particular threshold, the second UE may notify the first base station that there is a second UE that currently suffers downlink interferences therefrom via the second base station communicating therewith and a Mobile Management Entity (MME) located in a core network.

The process of Method 1 will be explained in detail with respect to FIG. 2. In the following process, the first base station refers to the small cellular base station, the second base station refers to the major cellular base station and the second UE refers to the MUE.

Figure 2:
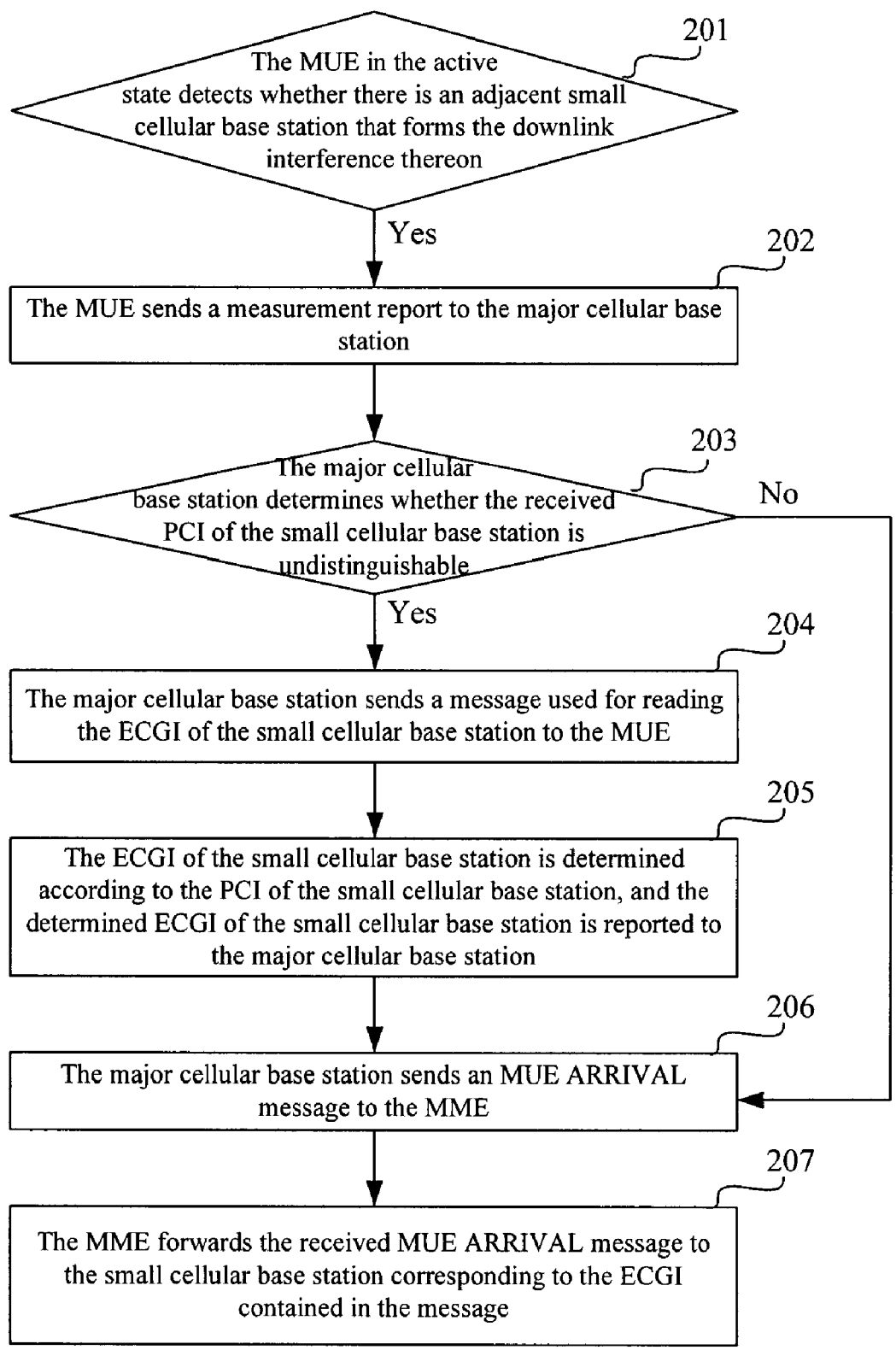
FIG. 2 is a methodology flowchart of a first method for notifying a first base station that there is a second UE that currently suffers downlink interference therefrom.

FIG. 2 shows a procedure for notifying the small cellular base station that there is an MUE that currently suffers downlink interferences therefrom using the Method 1. As illustrated in FIG. 2, the method mainly includes the following:

Step 201: The MUE in the active state detects whether there is an adjacent small cellular base station that forms downlink interferences on it, and when detecting that there is an adjacent small cellular base station that forms downlink interferences on it, executes Step 202.

When the MUE in the active state suffers serious downlink interferences, the downlink communication performance between the MUE and the major cellular base station may be deteriorated, e.g. packet loss rate and transmission time delay are increased, etc. At this time, the MUE may detect whether there is an adjacent small cellular base station that forms downlink interferences on it.

Besides, in this step, the method for the MUE to detect whether there is an adjacent small cellular base station that forms downlink interferences on it specifically includes the following:

Step 2011: The MUE detects whether the Reference Signal Received Power (RSRP) of the base station that it receives exceeds a preset threshold, and if yes, executes Step 2012.

Step 2012: The MUE further determines whether the Physical Cell ID (PCI) of the base station the RSRP of which exceeds the preset threshold belongs to the Closed Subscriber Group (CSG) Physical Cell ID Range (csg-PhysCellIdRange) and whether the base station is included in the white list of the MUE, and if the PCI of the base station belongs to the Closed Subscriber Group Physical Cell ID Range and the base station is not included in the white list of the MUE, the MUE may determine that there is an adjacent small cellular base station that forms the downlink interference thereon.

The base station detected by the MUE in the above Step 2011 the RSRP of which exceeds the preset threshold may include both the small cellular base station and the major cellular base station, thus the MUE needs to further determine whether the detected base station the RSRP of which exceeds the preset threshold is the small cellular base station. In the embodiment, whether the base station is the small cellular base station may be determined by determining whether the PCI of the base station belongs to the CSG Physical Cell ID Range. Particularly, if the PCI of the detected base station the RSRP of which exceeds the preset threshold belongs to the CSG Physical Cell ID Range, the detected base station is the small cellular base station.

In addition, if the small cellular base station relatively close to the MUE permits the access of the MUE, the MUE may select to access the small cellular base station. At this time, even if the RSRP of the small cellular base station exceeds the preset threshold value, it may not form the downlink interference on the MUE. Typically, only the small cellular base station that does not permit the access of the MUE may form the downlink interference on the MUE. Therefore, in the process of determining the small cellular base station that forms the downlink interference on the MUE, it to further determines whether the small cellular base station the RSRP of which exceeds the preset threshold permits the access of the MUE. Typically, the MUE stores a white list used for recording the small cellular base station that permits the access of the MUE. Therefore, in the embodiment, whether the small cellular base station the RSRP of which exceeds the preset threshold permits the access of the MUE may be determined by determining whether the small cellular base station is included in the white list of the MUE. Particularly, if the small cellular base station is not included in the white list of the MUE, the small cellular base station does not permit the access of the MUE, and it may be thus determined that the small cellular base station forms the downlink interference on the MUE.

In the above Step 2011, when detecting that there is a plurality of base stations the RSRP of which exceeds the preset threshold, the MUE may perform the determination of Step 2012 for the base station thereamong that has the largest RSRP first, and if the condition of Step 2012 is met, takes it as the small cellular base station that forms the downlink interference thereon; or otherwise, if the condition of Step 2012 is not met, selects the base station having the second largest RSRP among the plurality of detected base stations the RSRP of which exceeds the preset threshold for performing the determination of Step 2012, and so on, until the small cellular base station meeting the condition of Step 2012 is found. The small cellular base station having been found is taken as the small cellular base station that forms the downlink interference thereon. That is, if, among the base stations the RSRP of which exceeds the preset threshold, there is a base station the PCI of which belongs to the Closed Subscriber Group Physical Cell ID Range and the base station is not included in the white list of the MUE, the MUE may determine that there is an adjacent small cellular base station that forms the downlink interference thereon, and may take the base station thereamong that has the largest RSRP as the small cellular base station that forms the downlink interference thereon.

Step 202: The MUE sends a measurement report to the major cellular base station, where the PCI of the small cellular base station that forms the downlink interference thereon is carried in the measurement report.

Step 203: The major cellular base station determines whether the received PCI of the small cellular base station is undistinguishable at the major cellular base station, and if yes, executes Step 204, or otherwise, obtains the Evolved Universal (UMTS) Terrestrial Radio Access Network (E-UTRAN) Cell Global Identifier (ECGI) of the small cellular base station according to the PCI of the small cellular base station that is reported from the MUE, and then executes Step 206. Specifically, the ECGI of each small cellular base station may uniquely identify the small cellular base station.

Step 204: The major cellular base station sends a message used for reading the ECGI of the small cellular base station to the MUE.

Step 205: When receiving the message used for reading the ECGI of the small cellular base station, the MUE determines the ECGI of the small cellular base station according to the PCI of the small cellular base station, and reports the determined ECGI of the small cellular base station to the major cellular base station.

Step 206: The major cellular base station sends an MUE ARRIVAL message to the MME. At least the ECGI of the small cellular base station that forms the downlink interference on the MUE is carried in the MUE ARRIVAL message.

In addition, the MUE ARRIVAL message may further carry the information of a Resource Block (RB) occupied by the MUE.

In this step, the major cellular base station may send the MUE ARRIVAL message to the MME via its S1 interface.

Step 207: The MME forwards the received MUE ARRIVAL message to the small cellular base station corresponding to the ECGI contained in the message, i.e. the small cellular base station that forms the downlink interference on the MUE, to notify the small cellular base station that there is an MUE that suffers the downlink interference therefrom.

At this time, the small cellular base station receiving the MUE ARRIVAL message is aware that it has formed the downlink interference on a certain MUE, and subsequently may perform the spectrum resources reallocation of Step 102.

Method 2:

In this method, when the second UE detects that downlink interferences from an adjacent first base station reach a particular threshold, the second UE notifies the first base station directly, to indicate that it is suffering the downlink interference from the first base station. In order to implement the above method, it is required to reserve a Resource Block in the uplink spectrum resources, and the second UE may notify the first base station that it is suffering the downlink interference therefrom using the reserved RB. The first base station, the second base station and the second UE may perform corresponding resource reservation according to the position of the reserved Resource Block. For example, in a normal communication process, the second UE does not use such Resource Block to perform uplink data transmission.

The process of Method 2 will be explained in detail in combination with FIG. 3. In the following process, the first base station refers to the small cellular base station, the second base station refers to the major cellular base station and the second UE refers to the MUE.

Figure 3:
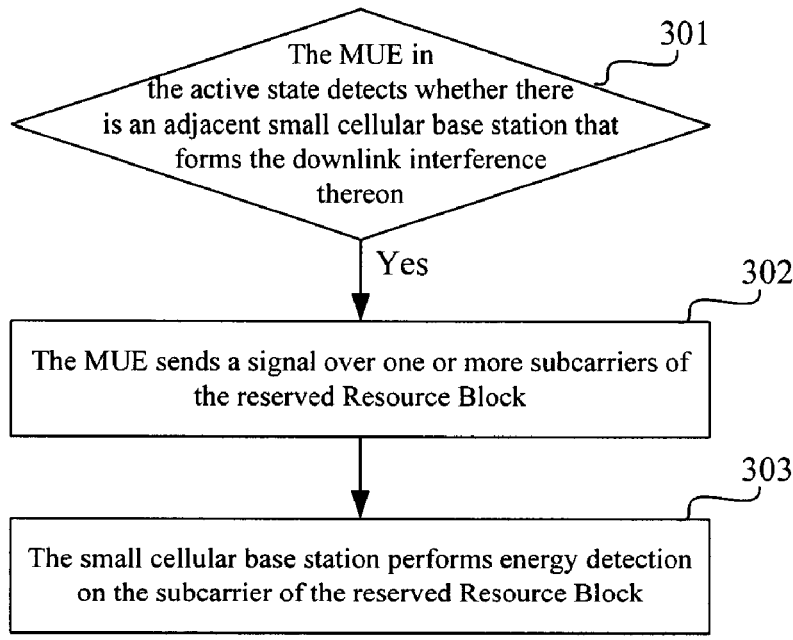
FIG. 3 is a methodology flowchart of a second method for notifying the first base station that there is a second UE that currently suffers the downlink interference therefrom.

FIG. 3 shows a procedure of notifying the small cellular base station that there is an MUE that currently suffers the downlink interference therefrom using the above Method 2. As illustrated in FIG. 3, the method mainly includes the following:

Step 301: The MUE in the active state detects whether there is an adjacent small cellular base station that forms downlink interferences on it, and if detecting that there is an adjacent small cellular base station that forms downlink interferences on it, executes Step 302.

In the above Step 301, the MUE may detects whether there is an adjacent small cellular base station that forms downlink interferences thereon using the method illustrated in Steps 2011 and 2012.

Step 302: The MUE sends a signal over one or more subcarriers of the reserved Resource Block.

Step 303: The small cellular base station performs energy detection on the subcarrier of the reserved Resource Block, and when energy detected on the subcarrier of the reserved Resource Block is above a preset threshold, the small cellular base station determines that there is an MUE that suffers the downlink interference therefrom.

To be noted, in the processes illustrated in FIGS. 2 and 3, the first base station refers to the small cellular base station, the second base station refers to the major cellular base station and the second UE refers to the MUE. Moreover, it is the MUE itself which performs the process of detecting whether the MUE suffers downlink interferences from the small cellular base station. As described above, the process of detecting whether there is a second UE that suffers downlink interferences from a first base station can be perform by another entity in the wireless cellular network, and the first base station can also refer to the major cellular base station and the second UE can also refer to the HUE.

At this time, the first base station is aware that it has formed the downlink interference on a certain second UE, and subsequently the spectrum resource reallocation of Step 102 may be performed.

Likewise, corresponding to the above two methods, there may be two methods in Step 103 for notifying the first base station that the second UE no longer suffers the downlink interference therefrom.

Method 1:

When the second UE changes from the active state into the idle state or the second UE detects that the RSRP of the first base station that forms the downlink interference thereon is below the preset threshold, the second UE may send a measurement report to the second base station. The PCI or the ECGI of the first base station that previously forms the downlink interference thereon is carried in the measurement report. Particularly, when the first base station still refers to the small cellular base station, if the MUE had received the message used for reading the ECGI of the small base station from the major base station during the process of executing Step 101, the ECGI of the small base station may be carried in the measurement report sent in this step, or otherwise, the PCI of the small base station may carried therein.

When the second base station receives the measurement report from the second UE, the second base station sends a second UE DEPARTURE message to the MME. The ECGI of the first base station that has formed the downlink interference on the second UE previously may also be carried in the second UE DEPARTURE message. In this step, the second base station may send the second UE DEPARTURE message to the MME via its S1 interface.

The MME forwards the second UE DEPARTURE message to the first base station corresponding to the ECGI contained in the second UE DEPARTURE message, to notify the first base station that the second UE no longer suffers the downlink interference therefrom.

Then, the first base station may reallocate the spectrum resource occupied by the first UE communicating therewith again, i.e. may perform wireless resource management as in the situation that there is no adjacent second UE that suffers the interference therefrom.

Method 2:

When the second UE changes from the active state into the idle state or the second UE detects that the RSRP of the first base station that forms the downlink interference thereon is below the preset threshold, the second UE may stop sending the signal over the one or more subcarriers of the reserved Resource Block. At this time, when the energy detected by the first base station on the subcarrier of the reserved Resource Block is below the preset threshold, the first base station may thus be aware that the second UE no longer suffers the downlink interference therefrom.

Additionally, if in the above Step 302, the second UE selects to send the signal over certain one or more subcarriers of the reserved Resource Block to indicate that it has suffered the downlink interference from a certain first base station, when the second UE changes from the active state into the idle state or the second UE detects that the RSRP of the first base station that forms the downlink interference thereon is below the preset threshold, the second UE may select to send the signal over other one or more subcarriers of the reserved Resource Block to indicate that it no longer suffers the interference from the first base station.

In order to differ from the case that the second UE uses one or more subcarriers of the reserved Resource Block to notify the first base station that it is suffering the downlink interference therefrom, in the embodiment of the present invention, the subcarrier on the reserved Resource Block may be divided into two groups, where each group includes at least one subcarrier. Specifically, the subcarrier of a first group, which may alternatively be called a first subcarrier, is used for notifying the first base station that the second UE is suffering the downlink interference therefrom, and the subcarrier of a second group, which may alternatively be called a second subcarrier, is used for notifying the first base station that the second UE no longer suffers the downlink interference therefrom.

In this case, the first base station may perform the energy detection on the subcarrier of the reserved Resource Block. When detecting that the energy on the first subcarrier is above the preset threshold, the first base station determines that there is an adjacent second UE that suffers the interference therefrom. When detecting that the energy on the second subcarrier is above the preset threshold, the first base station determines that there is no surrounding second UE that suffers the interference therefrom.

Hereinbelow, a method of the above Step 102 for the first base station to reallocate the spectrum resources used by the first UE communicating therewith will be described in detail. In the embodiment of the present invention, the first base station may reallocate the spectrum resources occupied by the first UE communicating therewith using four methods as follows.

The first method is applicable to the situation where the second base station and the first base station share part of the spectrum resources, i.e. the spectrum range shared by the two-layer wireless network is part of the available spectrum range, where the available spectrum range includes a shared spectrum resource and a non-shared spectrum resource. At this time, the first base station may reallocate the non-shared spectrum resource to the first UE that is communicating therewith and previously occupies the shared spectrum resources and release the shared spectrum resource for use in the communication between the second UE and the second base station.

The second method is that, the first base station releases, partially or entirely, the spectrum resource occupied by the non-real-time service of the first UE that is communicating therewith.

The third method is that, on the basis that the Quality of Service (QoS) or the Quality of Experience (QoE) of the first UE is not decreased, the first base station partially releases the spectrum resources occupied by the real-time service of the first UE that is communicating therewith.

The fourth method is to release key spectrum resources occupied by the communication between the second base station and the second UE, such as spectrum resources occupied by a control channel between the second base station and the second UE or spectrum resources occupied by real-time service between the second base station and the second UE. A method of the first base station acquiring the key spectrum resources occupied by the communication between the second base station and the second UE may include 1) pre-configure the key spectrum resources of the first base station and the second base station. For example, the position of the resources occupied by a control channel such as a PDCCH has been defined by standards, thus the first base station and the second base station can determine their own key spectrum resources previously and then notify the other, or the key spectrum resources of the first base station and the second base station can be pre-configured by an administrator. The other method may include 2) the first base station and the second base station may exchange their own key spectrum resources periodically via interfaces between base stations such as X2 or S1 interface. For example, the primary component carrier (PCC) of a base station may be changed due to the interference environment, in this case, the first base station and the second base station can exchange the position information of their PCC to get the other's key spectrum resource.

Regarding the above four methods, the first base station may perform any one, any two, any three or all of them to reallocate the spectrum resources occupied by the first UE communicating therewith.

Besides, if the second UE uses the above Method 1 to notify the first base station that there is an second UE that currently suffers the downlink interference therefrom and the information of the RB occupied by the second UE is carried in the second UE ARRIVAL message received by the first base station, the first base station may use any one, any two or all of the above three methods to release the RB occupied by the second UE at its best effort, so as to reduce the downlink interference on the second UE.

Embodiment 2

Besides the above method in which the first base station reallocates spectrum resources occupied by the first UE, another embodiment is provided to avoid the downlink interference from the first base station on a second UE. In this embodiment, when a second UE suffers downlink interferences from a first base station, the second base station communicating with the second UE may reallocate its spectrum resources to avoid the downlink interferences from the first base station.

Specifically, the method of interference suppression in a wireless cellular network according to the present embodiment may include: when a second UE in an active state suffers downlink interferences from an adjacent first base station, the second base station reallocates spectrum resources occupied by the second UE. Here, the second base station may reallocate spectrum resources which are not occupied by the first base station to the second UE.

To be noted, in the present embodiment, the spectrum resources may refer to sub-carriers, RBs, CCs or Bands. And the present embodiment does not put a limitation on the entity which performs the process of detecting whether there is a second UE suffers downlink interferences from an adjacent first base station. That is, such detection process can be performed by the second UE itself or by an another entity in the wireless cellular network, such as a road test entity.

In order to reallocate spectrum resources which are not occupied by the first base station to the second UE, the method of the present embodiment may further include: the second base station releases a part of or all of its spectrum resources and then reallocates spectrum resources to the second UE which suffers downlink interferences from the first base station. Specifically, when reallocating spectrum resources, the second base station may consider the QoS and/or QoE of the second UE. The spectrum resources occupied by service with a lower QoS of QoE requirement or non-key spectrum resources may be released first.

Further, when the second UE changes from the active state into an idle state or the second UE detects the downlink interference from the first base station that forms the interference on the second UE has been below a preset threshold, the above method may further include: the second base station reallocates the spectrum resources occupied by the second UE. Specifically, the second base station may reallocates the spectrum resources to the second UE as the second UE does not suffer downlink interferences from the first base station.

In addition to the above method of interference suppression, an embodiment of the present invention further provides a device for implementing the above method of interference suppression. Hereinbelow, the device for implementing the above method of interference suppression according to the embodiment of the present invention will be described in detail with reference to the accompanying drawings.

Particularly, an embodiment corresponding to Embodiment 1 of the present invention provides a first base station, a second base station and a second UE in the case that the above Method 1 is used to notify the first base station that there is a second UE that currently suffers the downlink interference therefrom.

Figure 4:
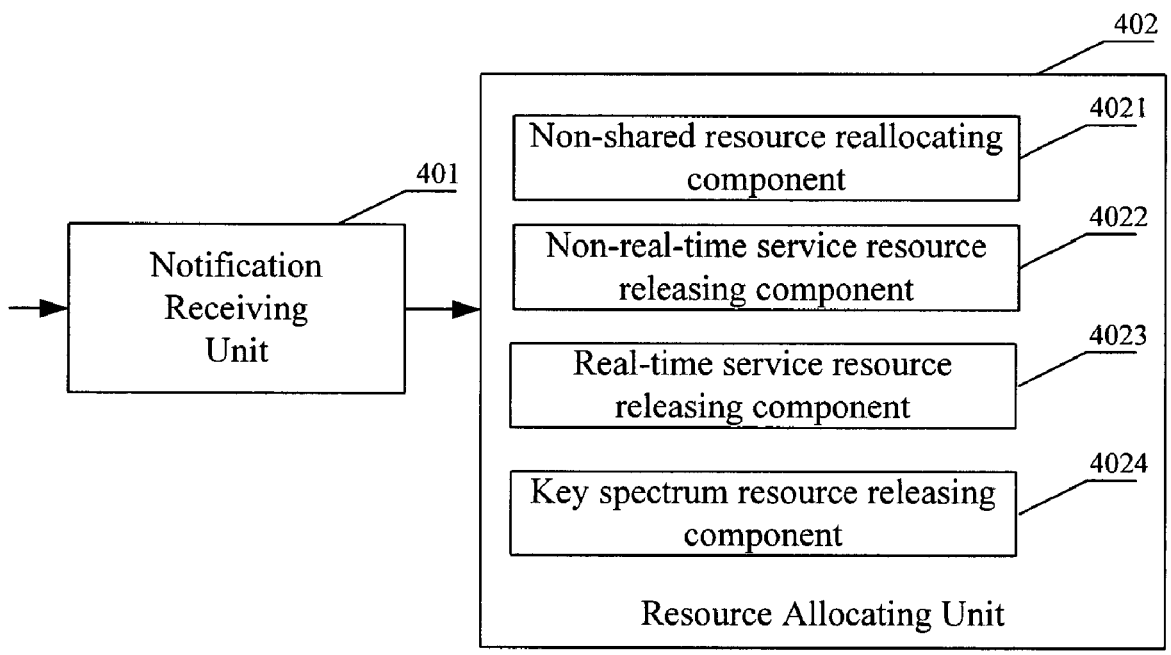
FIG. 4 is a schematic diagram illustrating an internal structure of the first base station according to an embodiment of the present invention.

The internal structure of the first base station provided by the embodiment is as illustrated in FIG. 4, which includes:

a notification receiving unit 401, adapted to receive a second UE ARRIVAL message from an MME, wherein the second UE ARRIVAL message indicates that there is a second UE that is suffering downlink interferences from the first base station; and a resource allocating unit 402, adapted to reallocate, after the second UE ARRIVAL message is received, a spectrum resource occupied by a first UE communicating with the first base station, so as to reduce the downlink interferences on the second UE from the first base station.

Specifically, the resource allocating unit 402 may use the four methods of the above Step 102 to reallocate the spectrum resource occupied by the first UE communicating therewith, which may specifically includes:

a non-shared resource reallocating component 4021, adapted to allocate, to the first UE that is communicating with the first base station and previously occupies the shared spectrum resources, the non-shared spectrum resources and to release the shared spectrum resource; and/or a non-real-time service resource releasing component 4022, adapted to release, partially or entirely, the spectrum resource occupied by a non-real-time service of the first UE that is communicating with the first base station; and/or a real-time service resource releasing component 4023, adapted to partially release, on the basis that QoS or QoE of the first UE is not decreased, the spectrum resource occupied by a real-time service of the first UE that is communicating with the first base station; and/or a key spectrum resource releasing component 4024, adapted to release key spectrum resources occupied by communications between the second base station and the second UE.

Figure 5:
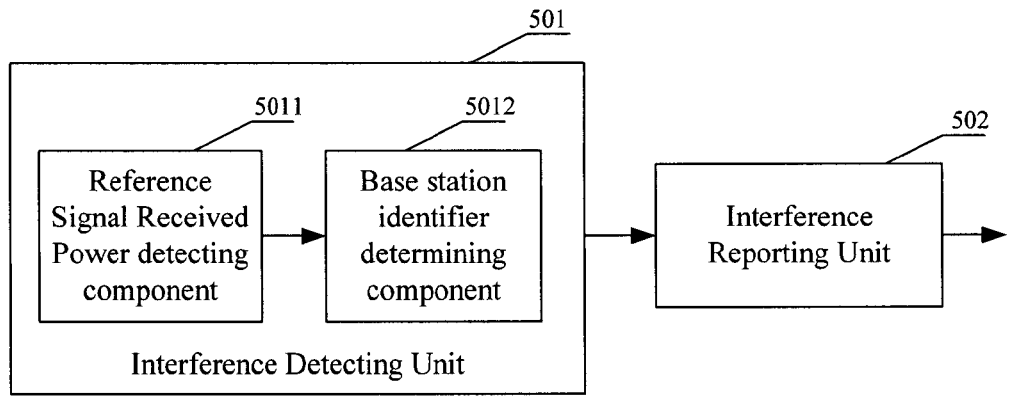
FIG. 5 is a schematic diagram illustrating an internal structure of the second UE according to an embodiment of the present invention.

The internal structure of the second UE provided by the embodiment is as illustrated in FIG. 5, which includes:

an interference detecting unit 501, adapted to detect whether there is an adjacent first base station that forms downlink interferences on itself; and an interference reporting unit 502, adapted to send, when it is detected that there is an adjacent first base station that forms the downlink interferences on the second UE, a measurement report to a second base station, wherein a PCI of the first base station that forms the downlink interferences on the second UE is carried in the measurement report.

Specifically, the interference detecting unit 501 includes:

a Reference Signal Received Power detecting component 5011, adapted to detect whether an RSRP of the base station that it receives exceeds a preset threshold; and a base station identifier determining component 5012, adapted to determine whether the PCI of the base station the RSRP of which exceeds the preset threshold belongs to a Closed Subscriber Group Physical Cell ID Range and whether the base station is included in a white list of the second UE; and if the PCI of the base station belongs to the Closed Subscriber Group Physical Cell ID Range and the base station is not included in the white list of the second UE, to determine it is detected that there is an adjacent first base station that forms the downlink interferences thereon.

The second UE according to the embodiment of the present invention may further include: an ECGI reporting unit 503, adapted to determine, after receiving a message occupied for reading an ECGI of the first base station from the second base station, the ECGI of the first base station that forms the downlink interferences on the second UE, and to report the determined ECGI to the second base station.

Figure 6:
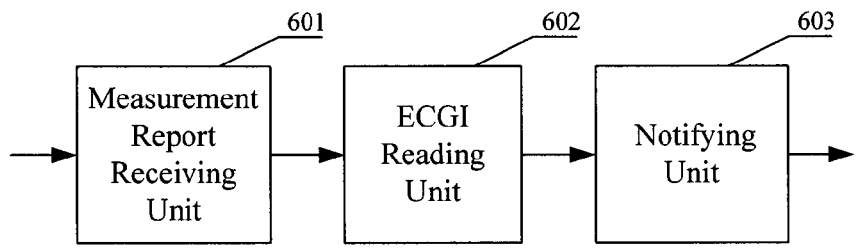
FIG. 6 is a schematic diagram illustrating an internal structure of a second base station according to an embodiment of the present invention.

The internal structure of the second base station provided by the embodiment is as illustrated in FIG. 6, which includes:

a measurement report receiving unit 601, adapted to receive a measurement report from a second UE, wherein a PCI of a first base station that forms downlink interferences on the second UE is included in the measurement report;

an ECGI reading unit 602, adapted to determine whether the received PCI of the first base station is undistinguishable, and if yes, to send a message used for reading an ECGI of the first base station to the second UE, and to receive the ECGI of the first base station that is fed back from the second UE, or otherwise, to obtain the ECGI of the first base station according to the PCI of the first base station that is reported from the second UE; and a notifying unit 603, adapted to send a second UE ARRIVAL message to an MME, wherein at least the ECGI of the first base station that forms the downlink interferences on the second UE is carried therein.

Another embodiment corresponding to Embodiment 1 of the present invention further provides a first base station and a second UE in the case that the above Method 2 is used to notify the first base station that there is a second UE that currently suffers the downlink interferences therefrom.

Figure 7:
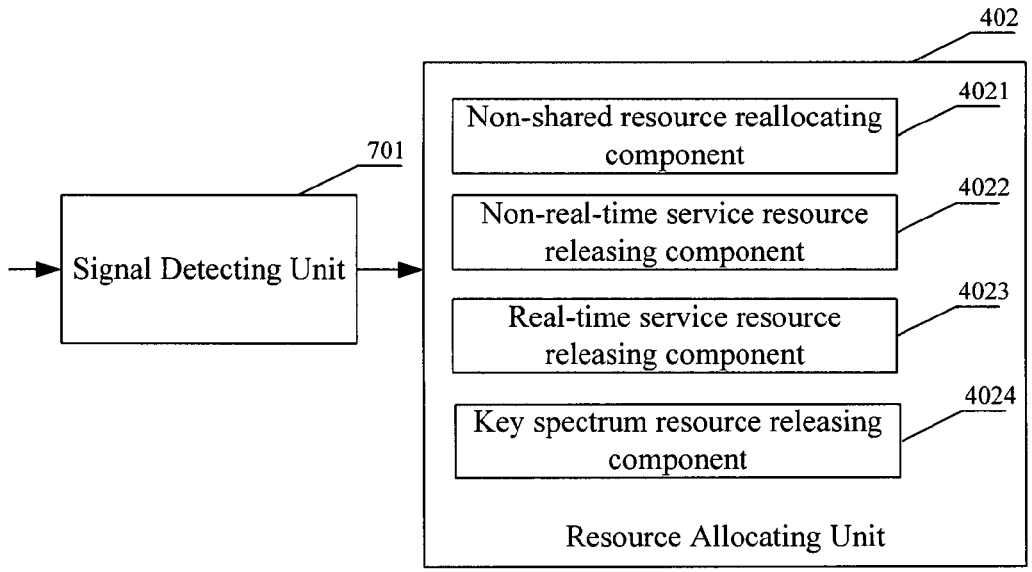
FIG. 7 is a schematic diagram illustrating the internal structure of the first base station according to another embodiment of the present invention.

The internal structure of the first base station provided by the embodiment is as illustrated in FIG. 7, which includes:

a signal detecting unit 701, adapted to perform energy detection on a subcarrier of a reserved Resource Block; and when detected energy is above a preset threshold, to determine that there is an adjacent second UE that suffers downlink interferences therefrom; and a resource allocating unit 402, adapted to reallocate, after it is determined that there is an adjacent second UE that suffers the downlink interferences therefrom, a spectrum resource occupied by a first UE communicating with the first base station, so as to reduce the downlink interferences on the second UE from the first base station.

Specifically, the above resource allocating unit 402 is identical to the resource allocating unit 402 as illustrated in FIG. 4, and also includes the above non-shared resource reallocating component 4021, and/or the non-real-time service resource releasing component 4022, and/or the real-time service resource releasing component 4023, and/or the key spectrum resource releasing component 4024.

Figure 8:
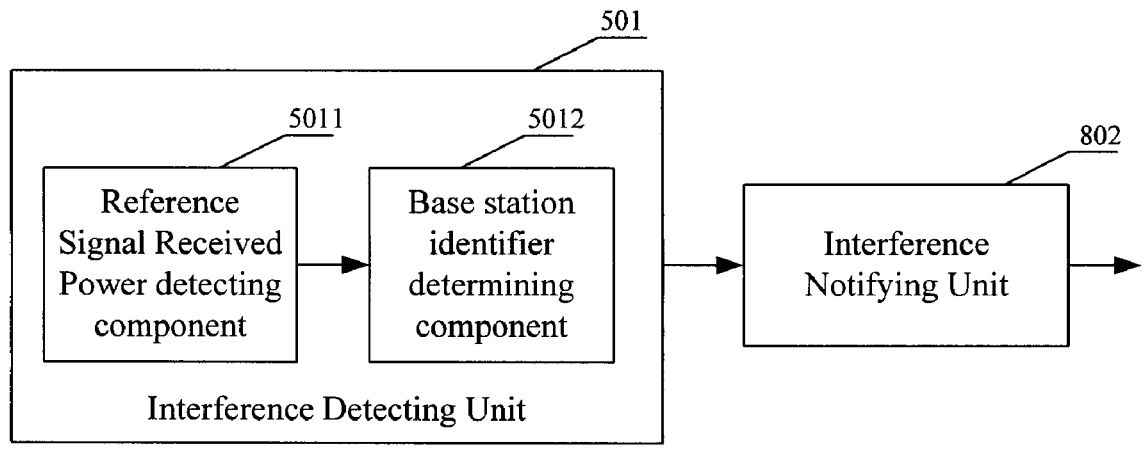
FIG. 8 is a schematic diagram illustrating the internal structure of the second UE according to another embodiment of the present invention.

The internal structure of the second UE provided by the embodiment is as illustrated in FIG. 8, which includes:

an interference detecting unit 501, adapted to detect whether there is an adjacent first base station that forms downlink interferences on it; and an interference notifying unit 802, adapted to send, when it is detected that there is an adjacent first base station that forms the downlink interferences on it, a signal over one or more subcarriers of a reserved Resource Block.

Specifically, the above interference detecting unit 501 is identical to the interference detecting unit 501 as illustrated in FIG. 5, and also includes the above Reference Signal Received Power detecting component 5011 and the base station identifier determining component 5012.

Still another embodiment corresponding to Embodiment 2 of the present invention provides a second base station. The second base station includes:

a measurement report receiving unit, adapted to receive a measurement report from a second UE, wherein the measurement report includes the PCI of a first base station which forms downlink interferences on the second UE;

a resource allocating unit, adapted to reallocate spectrum resources which are not occupied by the first base station to the second UE.

Using the method of interference suppression, base stations and UEs according to the embodiments of the present invention, when the communication between the second UE in the active state and the second base station suffers the downlink interferences from the adjacent first base station, the first base station can be notified, so that the first base station can adjust the spectrum resource occupied by the first UE through resource scheduling, so as to reduce the downlink interferences on the second UE, thus to reduce the influence on the communication between the second UE and the second base station.

Hereinbelow, a simulation model (as illustrated in Table 1) is provided using the 3GPP LTE network, to quantitatively simulate the method of interference suppression according to the embodiment of the present invention.

TABLE 1

| Parameter | Macrocell | Femtocell |
|---|---|---|
| Carrier Frequency | 2 GHz | 2 GHz |
| Bandwidth | 20 MHZ | 20 MHZ |
| Network Construction | 19 Macrocells, each has three sectors | 1 Femtocell, each has one sector |
| Antenna Gain | 14 dBi | 5 dBi |
| Cell Radius | 500/1.732 m | 10 m |
| Transmission Power | 49 dBm | 20 dBm |
| Path Loss Model | $128.1 + 37.6 \log_{10} d$ | $127 + 30 \log_{10} d$ |
| Shadow Fading Model | 8 dB | 10 dB |
| Penetration Loss Model | 20 dB | 20 dB |

In this example, the two-layer wireless cellular network is constituted by the Macrocell and the Femtocell. The Inter-Site-Distance of the Macrocell is 500 meters (m), and the transmission radius of each Femtocell is 10 m. Each Macrocell has three sectors, and each sector has 10 evenly-distributed users. Each Femtocell has one sector, and each Femtocell has 4 evenly-distributed users.

The 3GPP LTE network uses the Orthogonal Frequency Division Multiplexing (OFDM) technique, the bandwidth of each subcarrier is 15 KHz (kilohertz), and each Resource Block (RB) is composed of 12 subcarriers. In a spectrum shared mode, the available spectrum bandwidth is 20 MHz in total, where the spectrum bandwidth available for the Macrocell is 20 MHz and the spectrum bandwidth available for the Femtocell is 20 MHz. The resource scheduling method of user is in a Round Robin manner. 10 Resource Blocks are allocated for the MUE evenly. Assume that the emission power of the Macrocell base station is 49 dBm and the largest emission power of the small cellular base station is 20 dBm. 10% of the whole emission power of the base station is used as the emission power of a pilot signal. There are one emission antenna and two reception antennas respectively. The statistic data throughput is the data throughput resulted from removing 30% for the signaling overhead.

Figure 9:
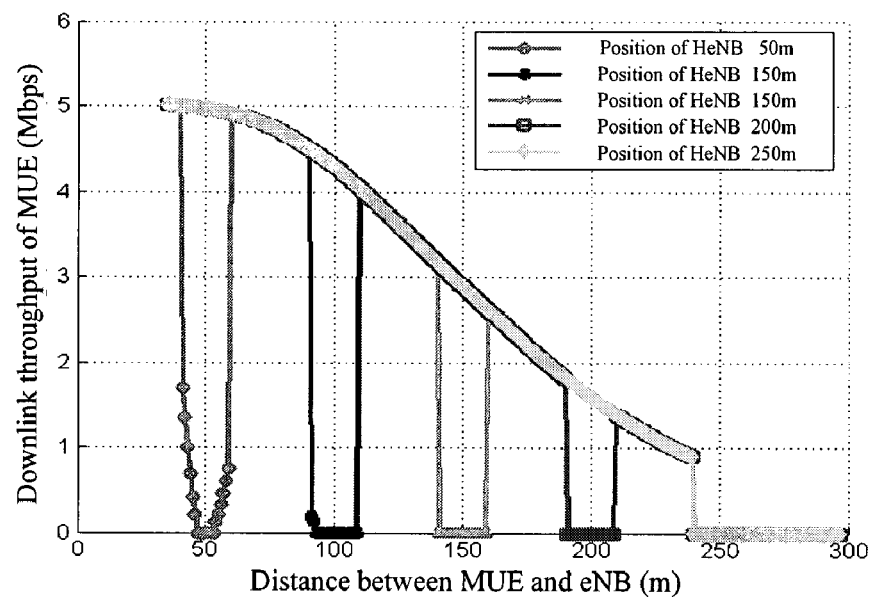
FIG. 9 shows a relationship of downlink data throughput of the MUE with a distance between the MUE and a Macrocell base station and with the position of a Femtocell base station.

FIG. 9 shows a relationship of downlink data throughput of the MUE with a distance between the MUE and a Macrocell base station eNB and with the position of a Femtocell base station HeNB. In FIG. 9, the horizontal axis represents the distance between the MUE and the Macrocell base station, and the vertical axis represents the downlink data throughput of the MUE. As can be seen from FIG. 9, no matter how long the distance from the MUE to the eNB, when the MUE moves to be relatively close to the HeNB (nearer than 10 m indoors), because suffering the downlink interferences from the HeNB, the downlink data throughput of the MUE may be reduced to nearly 0 Mbps. Thus, the communication being conducted between the MUE and the eNB may be interrupted.

The topmost curve in FIG. 9 shows the relationship of the downlink data throughput of the MUE with the distance between the MUE and the Macrocell base station eNB and with the position of the Femtocell base station HeNB after the method of interference suppression according to the embodiment of the present invention is used. As can be seen from the curve, the HeNB may avoid using the Resource Block occupied by the MUE by re-adjusting the resources of the HUE, thus the interferences on the MUE can be reduced significantly, thus increasing the downlink data throughput of the MUE. In the process of the simulation, it is assumed that the HeNB may avoid using all the 10 Resource Blocks allocated for the MUE by adjusting the resources of the HUE.

The foregoing illustrates merely embodiments of the present invention, and the present invention is not limited thereto. Any modifications, equivalents or improvements made without departing from the spirit and principle of the present invention are intended to fall into the scope of the present invention.

The invention claimed is:

1. A method of interference suppression in a wireless cellular network, comprising:
   notifying a first base station of a second User Equipment (UE) that currently suffers downlink interferences from the first base station, when the second UE in an active state suffers downlink interferences from the first base station; and
   reallocating, by the first base station, spectrum resources for a first UE communicating with the first base station, or, reallocating, by a second base station, spectrum resources for the second UE;
   wherein notifying the first base station of the second UE that currently suffers downlink interferences from the first base station comprises:
   receiving, by the second base station, a measurement report sent by the second UE, wherein the measurement report carries a Physical Cell ID (PCI) of the first base station;
   obtaining, by the second base station, an E-UTRAN Cell Global Identifier (ECGI) of the first base station according to the PCI of the first base station that is reported from the second UE;
   sending, by the second base station, a UE ARRIVAL message to a Mobile Management Entity (MME), wherein the UE ARRIVAL message carries the ECGI of the first base station; and
   forwarding, by the MME, the received UE ARRIVAL message to the first base station that forms the downlink interferences on the second UE.

2. The method according to claim 1, wherein obtaining, by the second base station, the ECGI of the first base station according to the PCI of the first base station that is reported from the second UE comprises:
   sending, by the second UE, a measurement report to a second base station, wherein the measurement report carries a Physical Cell ID (PCI) of the first base station;
   determining, by the second base station, whether the received PCI of the first base station is undistinguishable, and
   if the received PCI of the first base station is undistinguishable at the second base station, sending, by the second base station, a message used for reading an E-UTRAN Cell Global Identifier (ECGI) of the first base station, and reporting, by the second UE, the ECGI of the first base station to the second base station; and
   if the received PCI of the first base station is distinguishable at the second base station, obtaining, by the second base station, the ECGI of the first base station according to the PCI of the first base station that is reported from the second UE.

3. The method according to claim 1, further comprising detecting whether the second UE suffers downlink interferences from the first base station by:
- detecting, by the second UE, a Reference Signal Received Power (RSRP) of the base station;
- if the RSRP exceeds a preset threshold, determining whether the PCI of the base station belongs to a Closed Subscriber Group Physical Cell ID Range and whether the base station is included in a white list of the second UE; and
- if the PCI of the base station whose RSRP exceeds the preset threshold belongs to the Closed Subscriber Group Physical Cell ID Range and the base station is not included in the white list of the second UE, determining, by the second UE, that the second UE suffers downlink interferences from a first base station.

4. The method according to claim 1, wherein reallocating, by the first base station, spectrum resources for a first UE communicating with the first base station comprises one or more of:
- reallocating to the first UE that previously occupies the shared spectrum resources, spectrum resources that are not shared with the second base station and releasing the spectrum resources shared with the second base station; and
- releasing, partially or entirely, spectrum resources occupied by non-real-time service of the first UE; and
- on the basis that Quality of Service (QoS) or Quality of Experience (QoE) of the first UE is not decreased, partially releasing spectrum resources occupied by real-time service of the first UE; and
- releasing key spectrum resources occupied by communications between the second base station and the second UE.

5. The method according to claim 1, further comprising:
- notifying the first base station that the second UE no longer suffers downlink interferences from the first base station when the second UE changes from the active state into an idle state or the second UE detects the downlink interferences from the first base station has been below a preset threshold.

6. The method according to claim 5, further comprising:
- after being aware that the second UE no longer suffers downlink interferences from the first base station, reallocating, by the first base station, spectrum resources for the first UE communicating with the first base station.

7. The method according to claim 5, wherein notifying the first base station that the second UE no longer suffers downlink interferences from the first base station comprises:
- sending, by the second UE, a measurement report to the second base station, wherein a PCI or ECGI of the first base station that forms downlink interferences on the second UE is carried in the measurement report;
- sending, by the second base station, a second UE DEPARTURE message to an MME, wherein the second UE DEPARTURE message carries the ECGI of the first base station that forms downlink interferences on the second UE; and
- forwarding, by the MME, the second UE DEPARTURE message to the first base station.

8. The method according to claim 5, wherein notifying the first base station that the second UE no longer suffers the downlink interferences from the first base station comprises:
- stopping, by the second UE, sending a signal over one or more subcarriers of a reserved Resource Block.

9. The method according to claim 5, wherein notifying the first base station that the second UE no longer suffers the downlink interferences from the first base station comprises:
- sending, by the second UE, a signal over a second subcarrier of a reserved Resource Block;
- performing, by the first base station, energy detection on the second subcarrier of the reserved Resource Block; and
- when energy detected on the second subcarrier is above a preset threshold, determining, by the first base station, that no surrounding second UE exists that suffers the downlink interferences therefrom.

10. The method according to claim 1, wherein reallocating spectrum resources for the second UE comprises:
- releasing, by the second base station, a part of or all of its spectrum resources and reallocating spectrum resources which are not occupied by the first base station to the second UE.

11. The method according to claim 10, further comprising:
- when the second UE changes from the active state into an idle state or the second UE detects the downlink interference from the first base station that forms the downlink interferences on the second UE has been below a preset threshold, reallocating, by the second base station, spectrum resources for the second UE.

12. The method according to claim 1, wherein the spectrum resources comprise one of sub-carriers, resource blocks, component carriers or bands.

13. An apparatus, comprising:
- a measurement report receiving unit to receive a measurement report from a second user equipment (UE), wherein the measurement report includes a Physical Cell ID (PCI) of a first base station which forms downlink interferences on the second UE;
- an E-UTRAN Cell Global Identifier (ECGI) reading unit, adapted to obtain the ECGI of the first base station according to the PCI of the first base station that is reported from the second UE;
- a notifying unit, adapted to send a UE ARRIVAL message to a Mobile Management Entity (MME), wherein at least the ECGI of the first base station that forms the downlink interferences on the second UE is carried therein; and
- a resource allocating unit to reallocate spectrum resources which are not occupied by the first base station for the second UE.

14. The apparatus of claim 13, wherein the ECGI reading unit is further adapted to determine whether the received PCI of the first base station is undistinguishable, and if yes, to send a message used for reading an ECGI of the first base station to the second UE, and to receive the ECGI of the first base station that is fed back from the second UE.

* * * * *